(12) United States Patent
Connell et al.

(10) Patent No.: US 9,775,406 B2
(45) Date of Patent: Oct. 3, 2017

(54) ARTICLE OF FOOTWEAR WITH A SOLE ASSEMBLY HAVING A BLADDER ELEMENT AND A GUIDE COMPONENT AND METHOD OF MANUFACTURING THE ARTICLE OF FOOTWEAR

(71) Applicant: NIKE, Inc., Beaverton, OR (US)

(72) Inventors: Jeremy L. Connell, Hillsboro, OR (US); Benjamin J. Monfils, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 14 days.

(21) Appl. No.: 14/851,840

(22) Filed: Sep. 11, 2015

(65) Prior Publication Data

US 2016/0128424 A1     May 12, 2016

Related U.S. Application Data

(60) Provisional application No. 62/078,442, filed on Nov. 12, 2014.

(51) Int. Cl.
*A43B 13/20*     (2006.01)
*B29D 35/12*     (2010.01)
(Continued)

(52) U.S. Cl.
CPC .......... *A43B 13/20* (2013.01); *A43B 23/0265* (2013.01); *A43C 11/16* (2013.01); *B29D 35/0054* (2013.01); *B29D 35/122* (2013.01)

(58) Field of Classification Search
CPC ..... A43B 13/20; A43B 13/203; A43B 13/206; A43C 11/16
(Continued)

(56) References Cited

U.S. PATENT DOCUMENTS 2,147,197 A     2/1939   Glidden
2,314,098 A     3/1943   McDonald
(Continued)

FOREIGN PATENT DOCUMENTS

CA          989720 A      5/1976
CN        202335387 U     7/2012
(Continued)

OTHER PUBLICATIONS

Jeffrey, Byron, Product & Fashion Designer, PDF printout of website depicting concept, rendering, sketch dated Nov. 22, 2012 by Mr. Bailey, byronjeffrey.com/55336/881326/portfolio/dior, 4 pages, printed on Mar. 25, 2013.

*Primary Examiner* — Ted Kavanaugh
(74) *Attorney, Agent, or Firm* — Quinn IP Law (57) ABSTRACT

An article of footwear includes a sole assembly that has a bladder element with a first outer surface and a second outer surface opposite the first surface. A guide component is fused to one of the outer surfaces. The guide component has at least one groove extending laterally across the guide component. The at least one groove is configured to receive and guide at least one elongated member such that the elongated member is movable lengthwise when positioned in the at least one groove. A method of manufacturing a sole assembly for an article of footwear includes fusing the guide component to one of the first outer surface and the second outer surface of the bladder element.

17 Claims, 6 Drawing Sheets

(51) Int. Cl.
  *B29D 35/00*  (2010.01)
  *A43C 11/16*  (2006.01)
  *A43B 23/02*  (2006.01)

(58) Field of Classification Search
  USPC .......................................................... 36/29
  See application file for complete search history.

(56) References Cited

U.S. PATENT DOCUMENTS

| | | | |
|---|---|---|---|
| 2,343,390 A | 3/1944 | Ushakoff | |
| 2,440,393 A | 4/1948 | Clark | |
| 2,495,984 A | 1/1950 | Roy | |
| 2,569,764 A | 10/1951 | Jonas | |
| 2,608,078 A | 8/1952 | Anderson | |
| 2,641,004 A | 6/1953 | Whiting et al. | |
| 3,583,081 A | 6/1971 | Hayashi | |
| 4,183,156 A | 1/1980 | Rudy | |
| 4,219,945 A | 9/1980 | Rudy | |
| 4,340,626 A | 7/1982 | Rudy | |
| 4,447,967 A | 5/1984 | Zaino | |
| 4,592,154 A | 6/1986 | Oatman | |
| 4,654,985 A | 4/1987 | Chalmers | |
| 4,750,339 A | 6/1988 | Simpson, Jr. et al. | |
| 4,756,098 A | 7/1988 | Boggia | |
| 4,785,558 A | 11/1988 | Shiomura | |
| 4,811,503 A | 3/1989 | Iwama | |
| 4,813,158 A | 3/1989 | Brown | |
| 4,906,502 A | 3/1990 | Rudy | |
| 4,936,029 A | 6/1990 | Rudy | |
| 5,003,711 A | 4/1991 | Nerrinck et al. | |
| 5,042,176 A | 8/1991 | Rudy | |
| 5,083,361 A | 1/1992 | Rudy | |
| 5,291,671 A | 3/1994 | Caberlotto et al. | |
| 5,345,638 A | 9/1994 | Nishida | |
| 5,353,459 A | 10/1994 | Potter et al. | |
| 5,371,957 A | 12/1994 | Gaudio | |
| 5,463,822 A | 11/1995 | Miller | |
| 5,543,194 A | 8/1996 | Rudy | |
| 5,678,329 A | 10/1997 | Griffin et al. | |
| 5,692,319 A | 12/1997 | Parker et al. | |
| 5,713,141 A | 2/1998 | Mitchell et al. | |
| 5,755,044 A | 5/1998 | Veylupek | |
| 5,791,021 A | 8/1998 | James | |
| 5,934,599 A | 8/1999 | Hammerslag | |
| 5,952,065 A | 9/1999 | Mitchell et al. | |
| 6,013,340 A | 1/2000 | Bonk et al. | |
| 6,032,387 A | 3/2000 | Johnson | |
| 6,052,921 A | 4/2000 | Oreck | |
| 6,082,025 A | 7/2000 | Bonk et al. | |
| 6,127,026 A | 10/2000 | Bonk et al. | |
| 6,202,953 B1 | 3/2001 | Hammerslag | |
| 6,203,868 B1 | 3/2001 | Bonk et al. | |
| 6,286,233 B1 | 9/2001 | Gaither | |
| 6,289,558 B1* | 9/2001 | Hammerslag | A43B 5/16 24/68 SK |
| 6,321,465 B1 | 11/2001 | Bonk et al. | |
| 6,333,105 B1 | 12/2001 | Tanaka et al. | |
| D456,121 S | 4/2002 | Smith, III | |
| 6,378,230 B1 | 4/2002 | Rotem et al. | |
| D472,041 S | 3/2003 | Kuerbis | |
| 6,598,322 B2 | 7/2003 | Jacques et al. | |
| 6,665,958 B2* | 12/2003 | Goodwin | A43B 13/12 36/29 |
| 6,689,558 B2 | 2/2004 | Case | |
| 6,772,541 B1 | 8/2004 | Ritter et al. | |
| 6,837,951 B2 | 1/2005 | Rapaport | |
| 7,000,335 B2 | 2/2006 | Swigart et al. | |
| 7,134,224 B2 | 11/2006 | Elkington et al. | |
| 7,210,249 B2 | 5/2007 | Passke et al. | |
| D553,842 S | 10/2007 | Paz | |
| 7,343,701 B2 | 3/2008 | Pare et al. | |
| 7,392,990 B2 | 7/2008 | Bussiere | |
| 7,513,067 B2 | 4/2009 | Marvin et al. | |
| 7,546,698 B2 | 6/2009 | Meschter | |
| 7,562,470 B2 | 7/2009 | Keen | |
| 7,568,298 B2 | 8/2009 | Kerns | |
| 7,574,818 B2 | 8/2009 | Meschter | |
| 7,591,084 B2 | 9/2009 | Santa Ana | |
| 7,793,435 B1 | 9/2010 | Ruth | |
| 8,006,410 B2 | 8/2011 | Romboli et al. | |
| 8,074,379 B2 | 12/2011 | Robinson, Jr. et al. | |
| D651,380 S | 1/2012 | Wilcots | |
| 8,151,490 B2 | 4/2012 | Sokolowski | |
| 8,230,618 B2 | 7/2012 | Bruce et al. | |
| 8,307,570 B2 | 11/2012 | Delgatty | |
| 8,387,282 B2 | 3/2013 | Baker et al. | |
| 8,505,220 B2 | 8/2013 | James et al. | |
| 8,747,593 B2 | 6/2014 | Chao et al. | |
| 2002/0148258 A1 | 10/2002 | Cole et al. | |
| 2003/0066207 A1 | 4/2003 | Gaither | |
| 2003/0101620 A1 | 6/2003 | Reed et al. | |
| 2004/0181972 A1 | 9/2004 | Csorba | |
| 2009/0126231 A1 | 5/2009 | Malmivaara | |
| 2009/0151195 A1 | 6/2009 | Forstrom et al. | |
| 2009/0151196 A1 | 6/2009 | Schindler et al. | |
| 2010/0043253 A1 | 2/2010 | Dojan et al. | |
| 2010/0154256 A1 | 6/2010 | Dua | |
| 2010/0199406 A1 | 8/2010 | Dua et al. | |
| 2010/0199520 A1 | 8/2010 | Dua et al. | |
| 2011/0197475 A1 | 8/2011 | Weidl et al. | |
| 2011/0258876 A1 | 10/2011 | Baker et al. | |
| 2012/0102783 A1* | 5/2012 | Swigart | A43B 13/206 36/83 |
| 2012/0131818 A1 | 5/2012 | Nishiwaki et al. | |
| 2012/0240428 A1 | 9/2012 | Knoll | |
| 2012/0255201 A1 | 10/2012 | Little | |
| 2013/0086815 A1 | 4/2013 | Toraya | |
| 2013/0283640 A1 | 10/2013 | Elder et al. | |
| 2014/0173938 A1* | 6/2014 | Beye | A43B 9/12 36/102 |
| 2014/0182167 A1* | 7/2014 | James | A43B 7/1465 36/88 |
| 2014/0223779 A1 | 8/2014 | Elder et al. | |
| 2014/0283412 A1* | 9/2014 | Elder | A43B 13/127 36/102 |
| 2015/0089839 A1* | 4/2015 | James | A43B 11/00 36/102 |

FOREIGN PATENT DOCUMENTS

| | | |
|---|---|---|
| DE | 1084173 B | 6/1960 |
| DE | 19738433 A1 | 4/1998 |
| DE | 19728848 A1 | 1/1999 |
| EP | 0448714 A1 | 10/1991 |
| EP | 0728860 A1 | 8/1996 |
| EP | 0758693 A1 | 2/1997 |
| EP | 1233091 A1 | 8/2002 |
| EP | 000014915-0006 D | 5/2003 |
| FR | 2171172 A1 | 9/1973 |
| FR | 2697727 A3 | 5/1994 |
| GB | 538865 A | 8/1941 |
| GB | 1603487 A | 11/1981 |
| JP | H06113905 A | 4/1994 |
| JP | H08109553 A | 4/1996 |
| JP | 09065908 A | 3/1997 |
| JP | H11302943 A | 11/1999 |
| JP | 2007190351 A | 8/2007 |
| NL | 7304678 A | 10/1974 |
| WO | 9003744 A1 | 4/1990 |
| WO | 0032861 A1 | 6/2000 |
| WO | 0231247 A1 | 4/2002 |

\* cited by examiner

ARTICLE OF FOOTWEAR WITH A SOLE ASSEMBLY HAVING A BLADDER ELEMENT AND A GUIDE COMPONENT AND METHOD OF MANUFACTURING THE ARTICLE OF FOOTWEAR

CROSS-REFERENCE TO RELATED APPLICATIONS

This application claims the benefit of U.S. Provisional Application Ser. No. 62/078,442, filed on Nov. 12, 2014, which is hereby incorporated by reference in its entirety.

TECHNICAL FIELD

The present teachings generally include an article of footwear with a sole assembly and a method of manufacturing an article of footwear.

BACKGROUND

Footwear typically includes a sole assembly configured to be located under a wearer's foot to space the foot away from the ground or floor surface. Sole assemblies can be designed to provide a desired level of cushioning. A sole assembly is secured to an upper. The upper often is tightened with a shoelace to secure the article of footwear to a wearer's foot. Athletic footwear in particular sometimes utilizes polyurethane foam or other resilient materials in the sole assembly to provide cushioning.

DESCRIPTION

An article of footwear includes a sole assembly that has a bladder element with a first outer surface and a second outer surface opposite the first outer surface. The sole assembly has a guide component fused to the first outer surface or the second outer surface. The guide component has at least one groove extending laterally across the guide component. The at least one groove is configured to receive and guide at least one elongated member such that the at least one elongated member is movable lengthwise when positioned within the at least one groove. In one embodiment, the at least one groove is a three-sided channel. The guide component may be formed from a polymeric material in one embodiment.

In one example embodiment, the bladder element has side surfaces extending from the first outer surface to the second outer surface, and the guide component has side portions fused to the side surfaces. The at least one groove may include at least two grooves. Adjacent ones of the at least two grooves may join with one another on the side portions. Additionally, the guide component may have apertures between adjacent ones of the at least two grooves. The apertures may increase flexibility of the guide component and the bladder element.

The guide component may have at least one retaining bar that extends across a respective one of the at least one groove. The at least one retaining bar helps to retain the at least one elongated member in the at least one groove.

The sole assembly may include an outsole secured to the guide component such that the at least one groove is partially enclosed by the outsole. Additionally, an upper may be secured to the sole assembly. The upper may have at least one anchoring feature configured to receive the at least one elongated member such that the at least one elongated member extends through the at least one groove and the at least one anchoring feature, the bladder element thereby being biased toward the upper by force of the at least one elongated member against the guide component.

In one embodiment, the at least one anchoring feature includes an anchoring element secured to a body of the upper at a heel region of the upper. The at least one elongated member may extend through an opening in the anchoring element and may be retained between the anchoring element and the body of the upper. In one embodiment, the at least one anchoring feature includes at least one eyelet in the upper and the at least one elongated member extends through the at least one eyelet. The article of footwear may include at least one guide secured to the upper. The at least one elongated member may extend through the at least one guide between the at least one groove and the at least one eyelet.

The bladder element may have side surfaces that extend from the first outer surface to the second outer surface. The guide component may have side portions fused to the side surfaces. The at least one groove may be at least two grooves. Adjacent ones of the at least two grooves may join with one another on the side portions. The side portions may include a lateral side portion and a medial side portion. The lateral side portion and the medial side portion may each have at least one retaining bar that extends across the at least one groove to retain the at least one elongated member when the at least one elongated member is positioned in the at least one groove.

In one example embodiment, an article of footwear includes an upper and an outsole. A sole assembly is secured to the upper and has a bladder element with a first outer surface facing toward the upper, and a second outer surface opposite the first outer surface facing toward the outsole. A lateral side surface and a medial side surface of the bladder element extend from the first outer surface to the second outer surface. A guide component is fused to the bladder element. The guide component has a bottom portion fused to the second outer surface, a lateral side portion fused to the lateral side surface, and a medial side portion fused to the medial side surface. The guide component forms at least one groove extending laterally across the bottom portion from the lateral side portion to the medial side portion. The outsole is secured to the bottom portion of the guide component to enclose the at least one groove along the bottom portion. The upper is configured to be secured to the at least one elongated member so that the at least one elongated member biases the bladder element toward the upper when the at least one elongated member is positioned in the at least one groove.

In one embodiment, the lateral side portion and the medial side portion of the guide component each have at least one retaining member that extends across the at least one groove to retain the at least one elongated member when the at least one elongated member is positioned in the at least one groove.

In an example embodiment, the upper has at least one anchoring feature that receives the at least one elongated member such that the at least one elongated member extends through the at least one groove and through the at least one anchoring feature, the bladder element thereby being biased toward the upper by force of the at least one elongated member against the guide component. The at least one anchoring feature may include an anchoring element secured to a body of the upper at a heel region of the upper. The at least one elongated member may extend through an opening in the anchoring element and be retained between the anchoring element and the body of the upper. The at least one anchoring feature may be at least one eyelet in the upper. The at least one elongated member may extend through the at least one eyelet. Additionally, at least one guide may be secured to the upper. The at least one elongated member may extend through the at least one guide between the at least one groove and the at least one eyelet.

A method of manufacturing a sole assembly for an article of footwear includes fusing a guide component to a first outer surface or a second outer surface of a bladder element. The second outer surface is opposite the first outer surface. The guide component has at least one groove extending laterally across the guide component. The at least one groove is configured to receive and guide at least one elongated member such that the at least one elongated member is movable lengthwise when positioned within the at least one groove.

Fusing the guide component to the first outer surface or the second outer surface of the bladder element may include thermoforming the bladder element in a thermoforming mold assembly with the guide component in the thermoforming mold assembly. Stated differently, the bladder element fuses to the guide component by thermally bonding to the guide component during thermoforming of the bladder element. Fusing the guide component to the first outer surface or the second outer surface of the bladder element may include at least one of vacuum forming the bladder element in a thermoforming mold assembly with the guide component in the thermoforming mold assembly or compression forming the bladder element in the thermoforming mold assembly with the guide component in the thermoforming mold assembly. In one embodiment, the method includes, prior to said fusing the guide component to the first outer surface or the second outer surface of the bladder element, placing the guide component in the thermoforming mold assembly, placing material for the bladder element in the thermoforming mold assembly, and closing the thermoforming mold assembly. Placing material for the bladder element in the thermoforming mold assembly may include placing an upper sheet of material for the bladder element and a lower sheet of material for the bladder element in the thermoforming mold assembly after placing the guide component in the thermoforming mold assembly.

The method may include injection molding the guide component prior to fusing the guide component to the first outer surface or the second outer surface of the bladder element. The method may further include securing an outsole to the guide component such that the at least one groove of the guide component is partially enclosed by the outsole. Additionally, the method may include securing an upper to the bladder element, positioning the at least one elongated member in the at least one groove, and securing the at least one elongated member to the upper such that the at least one elongated member biases the bladder element toward the upper.

The above features and advantages and other features and advantages of the present teachings are readily apparent from the following detailed description of the modes for carrying out the present teachings when taken in connection with the accompanying drawings.

"A," "an," "the," "at least one," and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range.

The terms "comprising," "including," and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

Those having ordinary skill in the art will recognize that terms such as "above," "below," "upward," "downward," "top," "bottom," etc., are used descriptively relative to the figures, and do not represent limitations on the scope of the invention, as defined by the claims.

Figure 1:
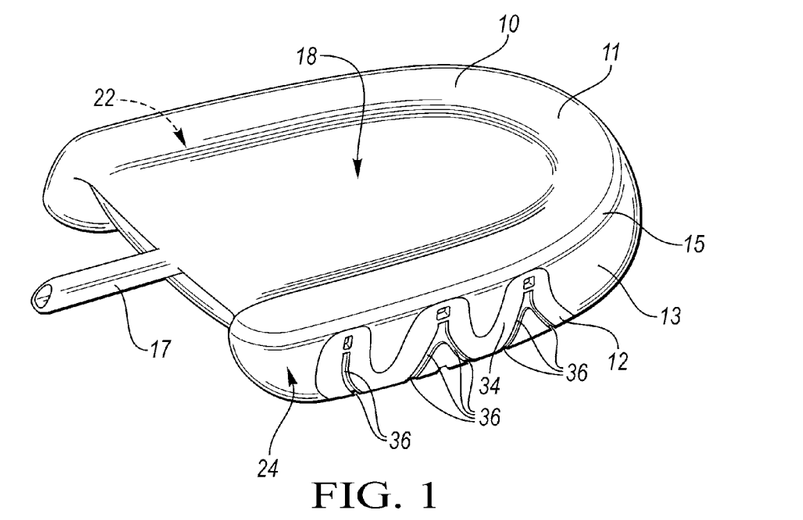
FIG. 1 is a schematic perspective illustration of a bladder element for an article of footwear with a guide component for an elongated member fused thereto.
Figure 5:
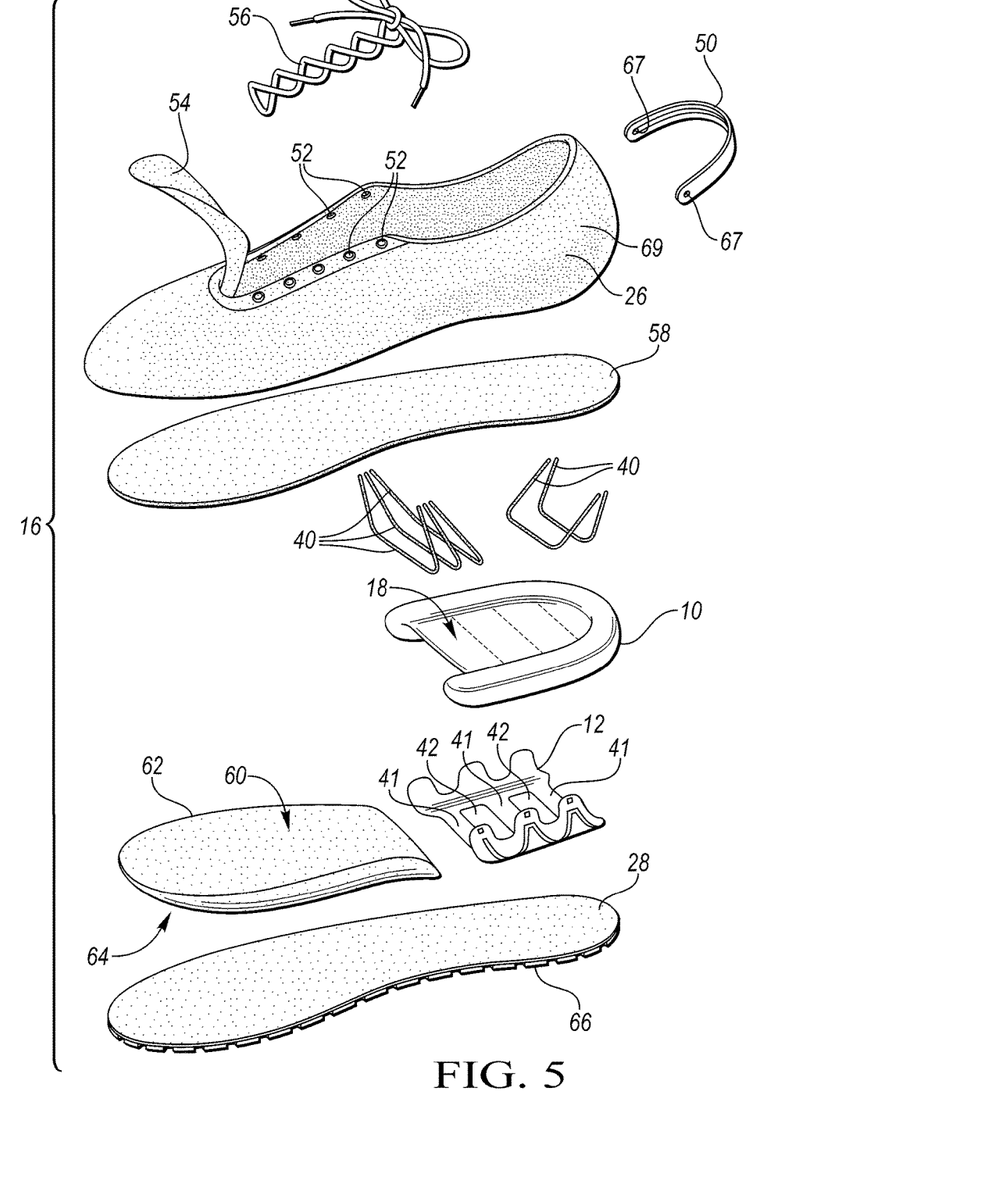
FIG. 5 is a schematic illustration in exploded view of an article of footwear with the bladder element and guide component of FIGS. 1-4.

Referring to the drawings, wherein like reference numbers refer to like components throughout the several views, FIG. 1 shows a fluid-filled bladder element 10 fused to a guide component 12. The bladder element 10 and guide component 12 are included in a sole assembly 14 of an article of footwear 16, such as shown in FIG. 5 or an alternative article of footwear 116 shown in FIG. 6. As further described herein, the guide component 12 is configured to receive, retain, and guide at least one elongated member positioned in one or more grooves 36 of the guide component 12 such that the elongated member can be used to bias the bladder element 10 against a wearer's foot in the article of footwear 16. In other words, the bladder element 10 is pulled upward toward the wearer's foot to minimize relative movement of the bladder element 10 with respect to the foot. As shown in FIG. 5, the article of footwear 16 is an athletic shoe. In other embodiments, the sole assembly 14 could be for an article of footwear that is a dress shoe, a work shoe, a sandal, a slipper, a boot, or any other category of footwear.

Figure 2:
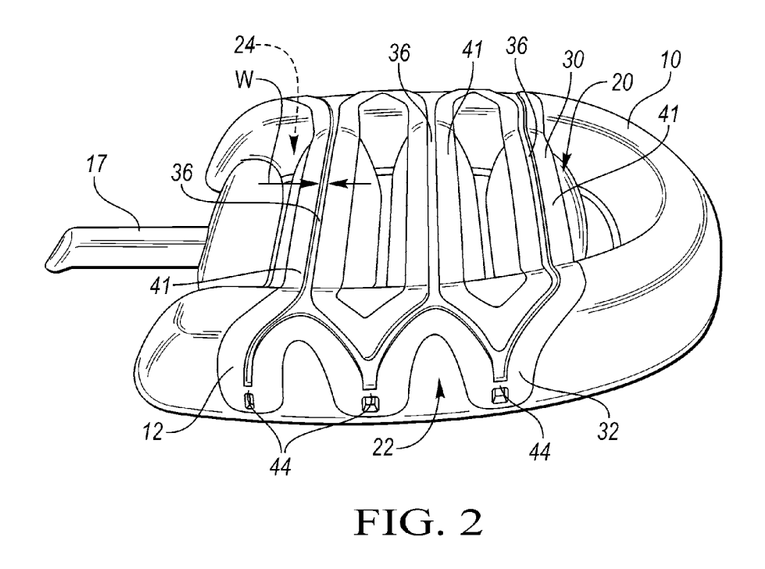
FIG. 2 is another schematic perspective illustration of the bladder element and the guide component of FIG. 1.
Figure 4:
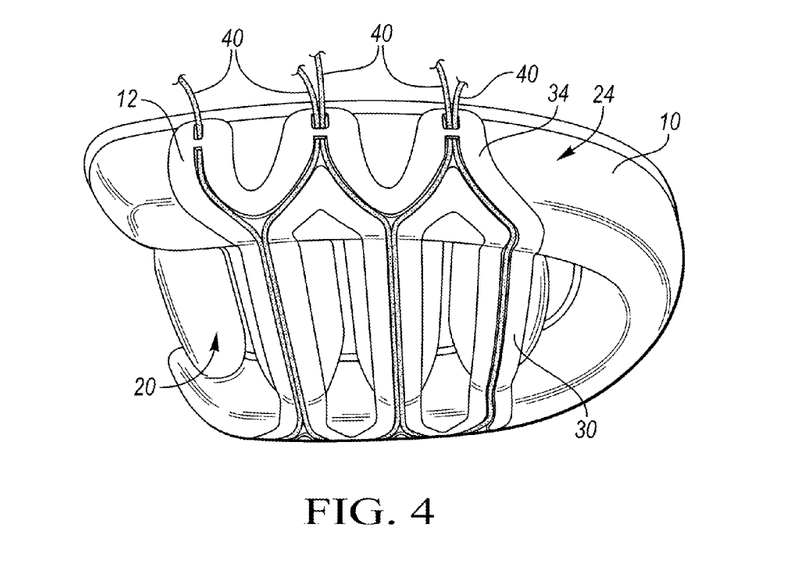
FIG. 4 is a schematic perspective illustration of the bladder element and the guide component of FIGS. 1-3 with elongated members slidably movable in the guide component.

The bladder element 10 has a first outer surface 18 best shown in FIG. 1 and a second outer surface 20 opposite the first outer surface 18, as best shown in FIGS. 2 and 4. A lateral side surface 22 and a medial side surface 24 each extend from the first outer surface 18 to the second outer surface 20. The lateral side surface 22 is best shown in FIG. 2 and may be a mirror image of the medial side surface 24. The lateral side surface 22 is positioned on the lateral side of the assembled article of footwear 16 and the medial side surface 24 is positioned on the medial side of the assembled article of footwear 16. As used herein, a lateral side of a component for an article of footwear, such as the lateral side surface 22 of the bladder element 10, is a side that corresponds with the side of the foot of the wearer of the article of footwear 16 that is generally further from the other foot of the wearer (i.e., the side closer to the fifth toe of the wearer). The fifth toe is commonly referred to as the little toe. A medial side of a component for an article of footwear, such as the medial side surface 24 of the bladder element 10, is the side that corresponds with an inside area of the foot of the wearer and is generally closer to the other foot of the wearer (i.e., the side closer to the hallux of the foot of the wearer). The hallux is commonly referred to as the big toe.

As used herein, a "fluid" retained in the internal cavity of the bladder element 10 may be a gas, such as nitrogen or air. As such, a "fluid-filled bladder element" is a bladder element that may be filled with a gas, such as nitrogen or air. The bladder element 10 may be thermoformed in a mold assembly 220 (shown in FIGS. 9 and 10) from an upper sheet 11 and a lower sheet 13. The upper and lower sheets 11, 13 may be vacuum formed to the shape of the mold assembly 220 during the thermoforming process. The thermoformed sheets 11, 13 may be bonded to one another at a peripheral flange 15 by compression forming during the thermoforming process to form an internal cavity therebetween. A fill tube 17 through which fluid is provided into the internal cavity of the bladder element 10 is shown in FIG. 1, and is plugged after inflating the bladder element 10 with a fluid such as air or nitrogen. The fill tube 17 is subsequently trimmed prior to assembling the article of footwear 16. Accordingly, the fill tube 17 is shown only in FIGS. 1 and 2. Fluid-filled bladder elements can be used to absorb shock and impact forces during use of the article of footwear 16. Although the bladder element 10 is shown positioned in a heel region of the article of footwear 16, the bladder element 10 may instead or in addition be positioned in the midfoot region or the forefoot region, or multiple bladder elements 10 can be positioned in different regions.

The bladder element 10 can be formed from a variety of polymeric materials that can resiliently retain a fluid such as nitrogen, air, or another gas. Examples of polymeric materials for the bladder element 10 include thermoplastic urethane, polyurethane, polyester, polyester polyurethane, and polyether polyurethane. Moreover, the bladder element 10 can be formed of layers of different materials including polymeric materials. In one embodiment, the bladder element 10 is formed from thin films having one or more thermoplastic polyurethane layers with one or more barrier layers of a copolymer of ethylene and vinyl alcohol (EVOH) that is impermeable to the pressurized fluid contained therein as disclosed in U.S. Pat. No. 6,082,025 to Bok et al., which is incorporated by reference in its entirety. Bladder element 10 may also be formed from a material that includes alternating layers of thermoplastic polyurethane and ethylene-vinyl alcohol copolymer, as disclosed in U.S. Pat. Nos. 5,713,141 and 5,952,065 to Mitchell et al. which are incorporated by reference in their entireties. Alternatively, the layers may include ethylene-vinyl alcohol copolymer, thermoplastic polyurethane, and a regrind material of the ethylene-vinyl alcohol copolymer and thermoplastic polyurethane. The bladder element 10 may also be a flexible microlayer membrane that includes alternating layers of a gas barrier material and an elastomeric material, as disclosed in U.S. Pat. Nos. 6,082,025 and 6,127,026 to Bonk et al. which are incorporated by reference in their entireties. Additional suitable materials for the bladder element 10 are disclosed in U.S. Pat. Nos. 4,183,156 and 4,219,945 to Rudy which are incorporated by reference in their entireties. Further suitable materials for the bladder element 10 include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340, 6,203,868, and 6,321,465 to Bonk et al. all of which are incorporated by reference in their entireties. In selecting materials for the bladder element 10, engineering properties such as tensile strength, stretch properties, fatigue characteristics, dynamic modulus, and loss tangent can be considered. The thicknesses of sheets of materials used to form the bladder element 10 can be selected to provide these characteristics.

The bladder element 10 is resilient and provides cushioning and flexibility that can be tuned such as by selecting a level of pressurization. Tensile members and/or reinforcing structures can be integrated with the bladder element 10 to provide desired responsiveness, such as disclosed in U.S. Pat. No. 4,906,502 to Rudy et al., and U.S. Pat. No. 8,061,060 to Swigart et al., which are incorporated by reference in their entireties.

The first outer surface 18 generally faces toward an upper 26 and the opposite second outer surface 20 generally faces toward an outsole 28 in the assembled article of footwear 16. Each of the surfaces 18, 20, 22, 24 is generally contoured in the inflated bladder element 10. Accordingly, portions of the first outer surface 18 face in various different directions and portions of the second outer surface 20 face in various different directions. However, the first outer surface 18 is closer than the second outer surface 20 to the upper 26 and at least portions of the first outer surface 18 face toward the upper 26, while at least portions of the second outer surface 20 face toward the outsole 28.

Figure 8:
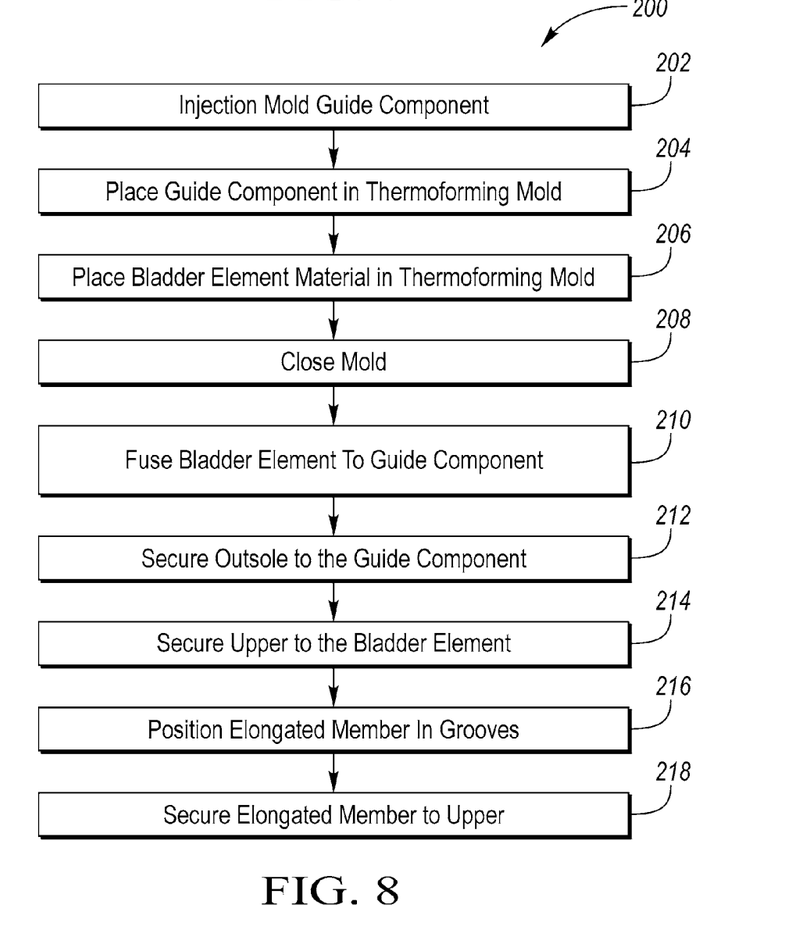
FIG. 8 is a flow diagram of a method of manufacturing an article of footwear with the bladder element and guide component of any of FIGS. 1-7.

The bladder element 10 fuses to the guide component 12 during thermoforming of the bladder element 10, as described in FIG. 8 in the method 200 of manufacturing the article of footwear 16, 116. The bladder element 10 fuses to the guide component 12 by thermally bonding to the guide component 12 during thermoforming of the bladder element 10. The guide component 12 can be any of a wide variety of polymeric materials such as a thermoset or thermoplastic elastomer, nylon, thermoplastic polyurethane, and thermoplastic polyurethane blends, such as thermoplastic polyurethane and nylon. In the embodiment of FIG. 1, the guide component 12 is an injection-molded plastic that is a unitary, one-piece component. Stated differently, the guide component 12 can be a single piece. With reference to FIGS. 1 and 2, the guide component 12 has a bottom portion 30 fused to the second outer surface 20 of the bladder element 10, a lateral side portion 32 fused to the lateral side surface 22 of the bladder element 10, and a medial side portion 34 fused to the medial side surface 24 of the bladder element 10.

Figure 3:
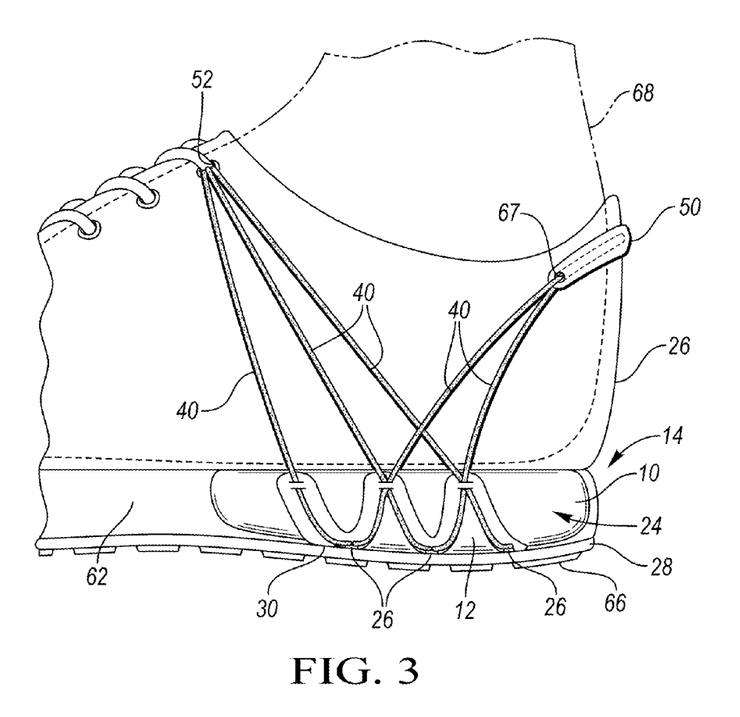
FIG. 3 is a schematic illustration in fragmentary side view of an article of footwear with the bladder element and guide component of FIGS. 1 and 2.

The guide component 12 has one or more grooves 36 that extend laterally across the bottom portion 30 from the lateral side portion 22 to the medial side portion 24. Stated differently, the guide component 12 has at least one groove 36, and may have at least two grooves 36, as shown. The grooves 36 are generally three-sided channels recessed in the guide component 12. Alternatively, the grooves 36 may have a rounded U-shape in cross-section. As formed, except at retaining bars 44 described herein, the grooves 36 are open along their lengths. The width W of the grooves 36 is sufficient to allow one or more desired elongated members 40 to be positioned lengthwise in the grooves 36, as shown in FIGS. 3 and 4, so that the one or more elongated members 40 are movable along their lengths. As shown in FIG. 3, the outsole 28 is secured to the bottom portion 30 of the guide component 12 to enclose the grooves 36 along the bottom portion 30. FIGS. 3 and 4 show five elongated members 40 that are tensioning cables extending lengthwise through the grooves 36. The elongated members 40 can be laces, threads, straps, tethers, cables, or combinations of these.

FIGS. 2 and 5 show that the guide component 12 has spaced bars 41 separated by apertures 42 in the bottom portion 30 of the guide component 12. The grooves 36 are formed in the bars 41. The apertures 42 are thus between adjacent ones of the grooves 36. The grooves 36 extend continuously from the bottom portion 30 to the side portions 32, 34. Adjacent ones of the grooves 36 merge to join with one another on the side portions 32, 34. The lateral side portion 32 and the medial side portion 34 of the guide component 12 are formed with retaining bars 44 each of which extends across a width W of a respective one of the grooves 36 or merged grooves 36. Each retaining bar 44 spans across a respective groove 36 (which may be merged grooves 36) to prevent the elongated member 40 from moving out of the open side of the groove 36.

Referring to FIG. 5, the article of footwear 16 is shown in exploded view. The upper 26 can be comprised of multiple separate pieces and materials such as fabric, textiles, leather, plastics, etc. In the embodiment shown, the upper 26 includes a relatively stiff anchoring element 50 secured to a heel region of the upper 26. The upper 26 includes a tongue 54 and various eyelets 52 surround an area in which a tongue 54 resides. Both the anchoring element 50 and the upper 26 at the eyelets 52 serve as anchoring features for the elongated members 40, as discussed herein. A shoelace 56 can be laced through the eyelets 52 to tighten the upper 26 across a midportion and forefoot portion of the article of footwear 16. The upper 26 may also include one or more leather portions, fabric mesh portions, a toe cap, a cloth lining, and a heel pull strap.

A strobel unit 58 can be stitched to the upper 26. Alternatively, heat seaming, bonding, or other suitable methods of securing the footwear upper 26 to the strobel unit 58 can be used. The strobel unit 58 is also adhered or bonded directly to an upward-facing surface 60 of a midsole layer 62. The midsole layer 62 may be formed from a resilient polymer foam material such as polyurethane or ethylene vinyl acetate (EVA). The outsole 28 is bonded to a downward-facing surface 64 of the midsole layer 62. The outsole layer 28 can include tread elements 66 that establish a ground contact surface of the article of footwear 16.

The anchoring element 50 has openings 67 through which a first set of the elongated members 40 are inserted to allow the elongated members 40 to be retained between the anchoring element 50 and the body 69 of the upper 26 around the back of the heel region. The ends of each of the first set of elongated members 40 can be knotted, otherwise enlarged, or bonded to the anchoring element 50 after passing through the openings 67 to retain the elongated members 40 to the anchoring element 50. The first set of elongated members 40 thus extend through the grooves 36 under the bladder element 10 and to the heel portion of the upper 26 to bias the bladder element 10 generally upward toward the foot 68 of the wearer of the article of footwear 16, as shown in FIG. 3.

The elongated members 40 are movable transversely within the grooves 36. That is, the elongated members 40 can move along their lengths (i.e., lengthwise) within the grooves 36 in reaction to forces applied to the article of footwear 16 by impact with the ground or by movement of the wearer's foot 68. Stated differently, the guide component 12 does not restrain movement of the elongated members 40 along their lengths. Allowing relative lengthwise movement of the elongated members 40 with respect to the guide component 12 may further secure the position of the bladder element 10 relative to the foot. Additionally, because the elongated members 40 are biased upward in the grooves 36, they do not touch the outsole 28, which may minimize wear on the elongated members 40.

The rearmost pair of eyelets 52 also serves as an anchoring feature for a second set of the elongated members 40 that extend through the rearmost eyelets 52. One eyelet 52 of the rearmost pair of eyelets 52 is shown in FIG. 3. The other eyelet 52 of the rearmost pair of eyelets 52 is on the opposite side of the upper 26. The ends of each of the second set of elongated members 40 can be knotted, otherwise enlarged, or bonded to the upper 26 after passing through the eyelet 52 to retain the elongated members 40 to the upper 26. Alternatively, separate looped members can extend downward from the eyelets 52, and the second set of elongated members 40 can form loops that interconnect with the looped members extending downward from the eyelets 52. The second set of elongated members 40 thus extend through the grooves 36 under the bladder element 10 and to the midfoot portion of the upper 26 to bias the bladder element 10 generally upward toward the foot 68 of the wearer of the article of footwear 16. Like the first set of elongated members 40, the second set of elongated members 40 can move along their lengths (i.e., lengthwise) within the grooves 36 in reaction to forces applied to the article of footwear 16 by impact with the ground or by movement of the wearer's foot 68.

In an alternative embodiment, the elongated members 40 can be a single continuous elongated member that is looped through the grooves 36 and the rearmost eyelets 52, and then back through the grooves and through the anchoring element 50 around the back of the upper 26 before its ends are secured to one another or to the upper 26.

Figure 6:
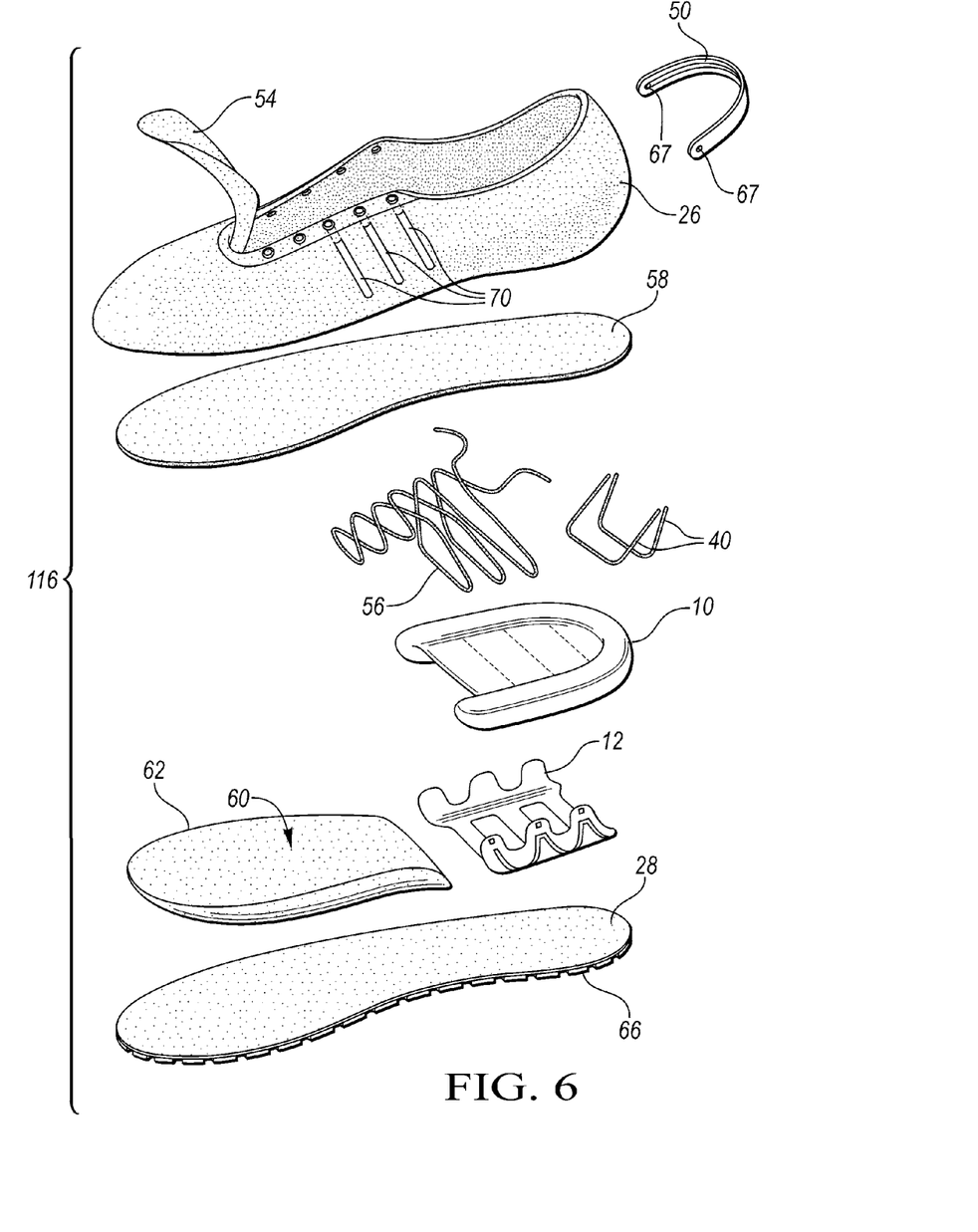
FIG. 6 is a schematic illustration in exploded view of an alternative article of footwear with the bladder element and guide component of FIGS. 1-2 within the scope of the present teachings.

FIG. 6 shows an alternative embodiment of an article of footwear 116 that has many of the same components as the article of footwear 16. Such like components are referred to with the same reference numbers in FIG. 6 as in FIGS. 1-5, and function as described with respect to FIGS. 1-5. The article of footwear 116 is different from the article of footwear 16 in that the upper 26 includes guides 70 secured to or integrally formed in the sides of the upper 26. Guides 70 on the medial side of the upper 26 are visible in FIG. 6. Identical guides 70 are included on the lateral side of the upper 26. The shoelace 56 serves as an additional elongated member, replacing the second set of elongated members 40 of the article of footwear 16. The shoelace 56 extends through the eyelets 52, the guides 70, and at least some of the grooves 36 of the guide component 12. Like the first set of elongated members 40, the shoelace 56 can move along its length (i.e., lengthwise) within the grooves 36 in reaction to forces applied to the article of footwear 116 by impact with the ground or by movement of the wearer's foot. The first set of elongated members 40 are positioned through the grooves 36 and through the opening 67 in the anchoring component 50 as described with respect to FIG. 5.

Figure 7:
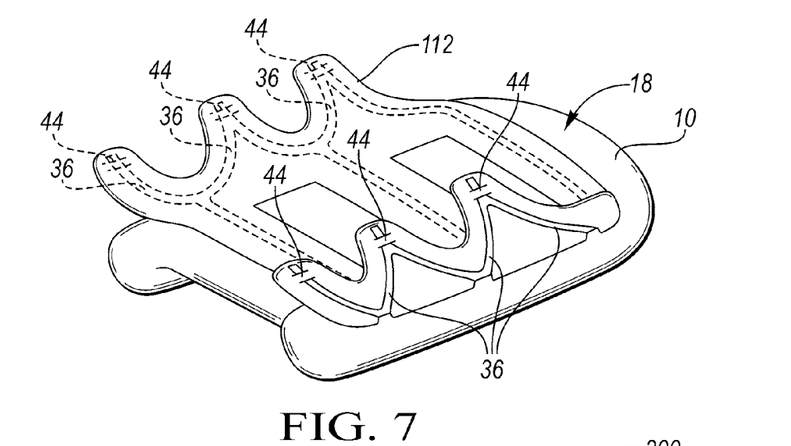
FIG. 7 is a schematic illustration in perspective view of a bladder element and an alternative guide component within the scope of the present teachings.

FIG. 7 shows an alternative embodiment of an injection molded guide component 112 and the bladder element 10 fused to one another by thermoforming the bladder element 10 with the guide component 112 in a thermoforming mold assembly used to thermoform the bladder element 10. The guide component 112 is fused to the first outer surface 18 of the bladder element 10 and is thus positioned between the upper 26 and the bladder element 10 when assembled as part of an article of footwear 16 or 116. When elongated members are positioned in the grooves 36 to extend through the grooves 36, they bias the bladder element 10 upward toward a foot of the wearer of the article of footwear 16, 116 because force on the elongated members acts on the bottom surface 30 of the guide component 112 (i.e., on the underside of the guide component 112 in FIG. 7, and thus pulls the guide component 112 toward the upper 26. Because the bladder element 10 is fused to the guide component 112, the bladder element 10 is also pulled toward the upper 26.

Figure 9:
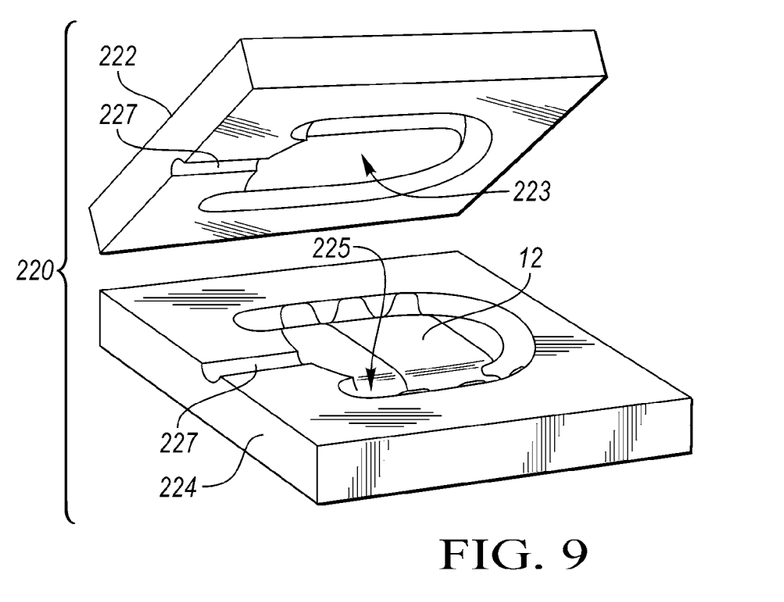
FIG. 9 is a schematic illustration in exploded view of a mold assembly with the guide component of FIG. 1 placed therein.

FIG. 8 is a flowchart of a method 200 of manufacturing an article of footwear such as the article of footwear 16 of FIG. 5, or the article of footwear 116 of FIG. 6. The method 200 is described with respect to the article of footwear 16 and the guide component 12, but can also be applied to an article of footwear with the guide component 112 of FIG. 7. The method 200 begins with step 202, injection molding the guide component 12. The same entity that performs the step 202 can perform the remaining steps of the method 200. Alternatively, different entities can perform different steps of the method 200. For example, one entity can injection mold the guide component in step 202, and provide the injection-molded guide component to another entity that performs one or more of the remaining steps of the method 200. Once the guide component 12 is completed, it is placed in a thermoforming mold assembly 220 in step 204. FIG. 9 shows the thermoforming mold assembly 220 having a first mold 222 and a second mold 224. The guide component 12 is shown positioned in the second mold 224 following step 202. The first mold 222 has a surface that defines a first mold cavity 223 and generally follows the shape of the first outer surface 18 and portions of the side surfaces 22, 24 of the bladder element 10. The second mold 224 has a surface that defines a second mold cavity 225 and generally follows the shape of the second outer surface 20 and portions of the side surfaces 22, 24 of the bladder element 10. Each of the mold cavities 223, 225 has a tube portion 227 which creates the fill tube 17 when the sheets 11, 13 are thermoformed. The resulting fill tube 17 can be plugged and trimmed. The flange portion 15 resulting by compression forming the upper and lower sheets 11, 13 is also trimmed after thermoforming to the resulting flange 15 of FIG. 1.

Figure 10:
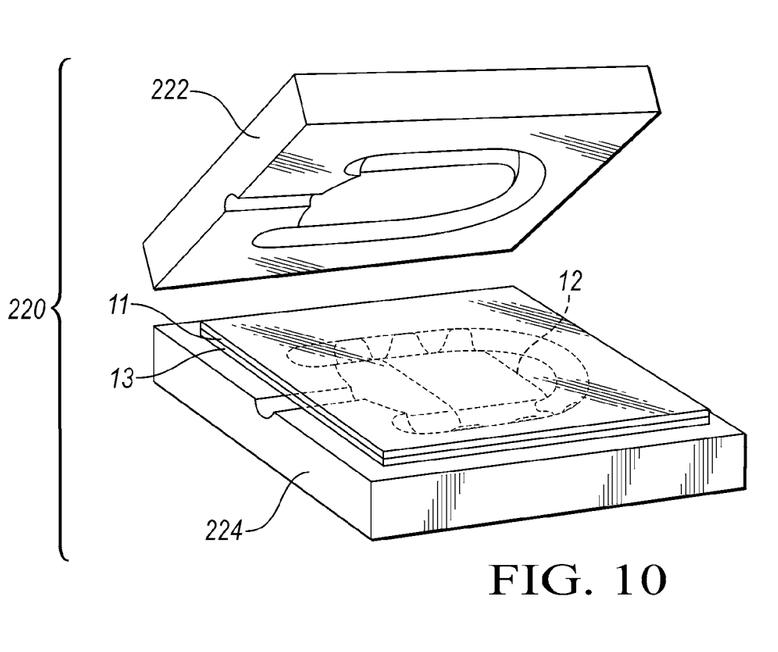
FIG. 10 is a schematic illustration in exploded view of the mold assembly of FIG. 9 with the guide component of FIG. 1 placed therein and sheets of material for forming the bladder element of FIG. 1 placed on the guide component.

Next, in step 206, material for the bladder element 10 is placed in the thermoforming mold assembly 220. For example, the bladder element 10 may be formed from the upper sheet 11 and the lower sheet 13. Each of the sheets 11, 13 can have multiple layers of thermoplastic polyurethane alternating with one or more barrier layers of a copolymer of ethylene and vinyl alcohol (EVOH), as discussed above. Step 206 may occur after step 204 in the embodiment shown. For example, as shown in FIG. 10, the sheets 11, 13 are placed on top of the guide component 12 in the second mold 224. In other embodiments, step 204 could occur before step 202. If a blow-molding technique is used to form the bladder element 10 instead of the technique using two sheets, then softened material for the bladder element 10 generally in the shape of a tube is placed in the mold 224 instead of the sheets 11, 13.

The molds 222, 224 are closed together in step 208 by aligning the first mold 222 with the second mold 224 so that the mold cavities 223, 225 align with one another, and the tube portions 227 align with one another.

In step 210, the guide component 12 is fused to the bladder element 10, such as by thermoforming the bladder element 10. The thermoforming process sufficiently heats the bladder element material (i.e., the sheets 11, 13) and the guide component 12 so that they fuse to one another. Fusing the bladder element 10 to the guide component 12 in the mold assembly 220 in step 210 can include vacuum forming the sheets 11, 13 to conform to the molds 222, 224, respectively. For example, a vacuum source can be in fluid communication with the cavities 223, 225 of the closed mold assembly 220, such as through openings extending through the molds 222, 224. The vacuum can cause the sheets 11, 13 to conform to the surface of the molds 222, 224. Fusing the bladder element 10 to the guide component 12 in the mold assembly 220 in step 210 can include compression forming the bladder element 10, such as by compressing the sheets 11, 13 to one another at the flange 15 via pressure applied through the molds 222, 224. The bladder element 10, with guide component 12 fused thereto, can then be removed from the mold assembly 220, inflated through the resulting tube 17, and the flange 15 and tube 17 can be trimmed.

The remaining steps 212, 214, 216, and 218 of the method 200 involve assembling the article of footwear 16 or 116 and can be performed by the same entity or by a different entity than the entity that performing steps 202-210. For example, the completed bladder element 10 fused to the guide component 12 can be provided to another entity that performs the remaining steps.

In step 212, the outsole 28 is secured to the guide component 12 such that the grooves 36 of the guide component 12 are partially enclosed by the outsole 28. In FIG. 3, the grooves 36 are shown enclosed by the outsole 28 from below, along the bottom portion 30 of the guide component 12.

Next, in step 214, the upper 26 is secured to the bladder element 10. The strobel unit 58 may also be secured to the bladder element 10. For example, the upper 26 can be secured at a periphery of the first outer surface 18 and the strobel unit 58 can be secured to a central portion of the first outer surface 18. Alternatively, a foam layer could be included between the bladder element 10 and the upper 26.

In step 216, at least one elongated member such as cables 40 and/or shoelace 56 is positioned in the one or more grooves 36, such as by threading through the grooves 36. The elongated member(s) are then secured to the upper 26 in step 218 such as through eyelets 52, and optionally through the guides 70, or through the anchoring element 50 secured to the heel region of the upper 26. The elongated members 40 and/or 56 are thus slidably movable lengthwise within the one or more grooves 36 and bias the bladder element 10 toward the upper 26.

Step 212 and step 214 can occur prior to step 216. Alternatively, step 212 can occur after step 216 to simplify positioning of the cables 40 and/or shoelace 56 in the grooves 36.

While several modes for carrying out the many aspects of the present teachings have been described in detail, those familiar with the art to which these teachings relate will recognize various alternative aspects for practicing the present teachings that are within the scope of the appended claims.

What is claimed is:

1. An article of footwear comprising:
   a sole assembly having:
      a bladder element with a first outer surface, a second outer surface opposite the first outer surface, and side surfaces extending from the first outer surface to the second outer surface;
      a guide component with a bottom portion fused to one of the first outer surface or the second outer surface and side portions fused to the side surfaces; wherein the guide component has multiple grooves extending laterally across the bottom portion of the guide component; wherein the multiple grooves are configured to receive and guide multiple elongated members such that the multiple elongated members are movable lengthwise when positioned in the multiple grooves; and
   wherein at least one of the side portions includes a finger on which two adjacent ones of the multiple grooves merge into a merged groove.

2. The article of footwear of claim 1, wherein the guide component has at least one retaining bar that extends across the merged groove.

3. The article of footwear of claim 1, wherein the multiple grooves are three-sided channels.

4. The article of footwear of claim 1, wherein the sole assembly includes an outsole secured to the guide component such that the multiple grooves are partially enclosed by the outsole.

5. The article of footwear of claim 1, in combination with the multiple elongated members, and further comprising:
   an upper secured to the sole assembly;
   wherein the upper has at least one anchoring feature that receives the multiple elongated members such that the multiple elongated members extend through the multiple grooves and through the at least one anchoring feature, the bladder element thereby being biased toward the upper by force of the multiple elongated members against the guide component.

6. The article of footwear of claim 5, wherein the at least one anchoring feature includes an anchoring element secured to a body of the upper at a heel region of the upper; and wherein at least one of the multiple elongated members extends through an opening in the anchoring element and is retained between the anchoring element and the body of the upper.

7. The article of footwear of claim 5, wherein the at least one anchoring feature is at least one eyelet in the upper; and wherein the at least one of the multiple elongated members extends through the at least one eyelet.

8. The article of footwear of claim 7, further comprising:
   at least one guide secured to the upper; and wherein the at least one of the multiple elongated members extends through the at least one guide between the at least one of the multiple grooves and the at least one eyelet.

9. The article of footwear of claim 1, wherein the side portions include a lateral side portion and a medial side portion; wherein each of the side portions includes a finger with a merged groove and a retaining bar that extends across the merged groove to retain the multiple elongated members when the multiple elongated members are positioned in the merged groove.

10. The article of footwear of claim 1, wherein the guide component has apertures between adjacent ones of the multiple grooves.

11. The article of footwear of claim 1, wherein the guide component is formed from a polymeric material.

12. The article of footwear of claim 1, further comprising:
   an upper;
   an outsole;
   wherein the sole assembly is secured to the upper so that the first outer surface of the bladder element faces toward the upper and the second outer surface of the bladder element faces toward the outsole;
   wherein the outsole is secured to the bottom portion of the guide component to enclose the multiple grooves along the bottom portion;
   wherein the upper is configured to be secured to the multiple elongated members so that the multiple elongated members bias the bladder element toward the upper when the multiple elongated members are positioned in the multiple grooves.

13. The article of footwear of claim 1, wherein the guide component is a unitary, one-piece component.

14. The article of footwear of claim 1, wherein:
   the side portions include a medial side portion and a lateral side portion which extend upwardly from the bottom portion; and
   the multiple grooves continue upward from the bottom portion along each of the medial side portion and the lateral side portion.

15. The article of footwear of claim 14, wherein:
   the medial side portion and the lateral side portion each include a plurality of separated fingers.

16. The article of footwear of claim 15, wherein the plurality of separated fingers are angled forward toward a front end of the guide component.

17. The article of footwear of claim 15, wherein the plurality of separated fingers of the medial side portion and the plurality of separated fingers of the lateral side portion each include a finger on which two adjacent ones of the multiple grooves merge into a merged groove.

* * * * *

UNITED STATES PATENT AND TRADEMARK OFFICE
CERTIFICATE OF CORRECTION

PATENT NO. : 9,775,406 B2
APPLICATION NO. : 14/851840
DATED : October 3, 2017
INVENTOR(S) : Jeremy L. Connell et al.

It is certified that error appears in the above-identified patent and that said Letters Patent is hereby corrected as shown below:

In the Claims

Column 12, Line 55, in Claim 17, "The article of footwear of claim 15," should read --The article of footwear of claim 16,--

Signed and Sealed this
First Day of May, 2018

Andrei Iancu
*Director of the United States Patent and Trademark Office*